United States Patent
Samdanis et al.

(10) Patent No.: US 12,289,659 B2
(45) Date of Patent: Apr. 29, 2025

(54) METHOD AND APPARATUS FOR USE IN COMMUNICATION NETWORKS HAVING CONTROL AND MANAGEMENT PLANES

(71) Applicant: NOKIA SOLUTIONS AND NETWORKS OY, Espoo (FI)

(72) Inventors: Konstantinos Samdanis, Munich (DE); Christian Mannweiler, Munich (DE); Cinzia Sartori, Pullach (DE); Fabio Giust, Pullach (DE)

(73) Assignee: Nokia Solutions and Networks Oy, Espoo (FI)

( * ) Notice: Subject to any disclaimer, the term of this patent is extended or adjusted under 35 U.S.C. 154(b) by 595 days.

(21) Appl. No.: 17/592,908

(22) Filed: Feb. 4, 2022

(65) Prior Publication Data
US 2022/0272510 A1 Aug. 25, 2022

(30) Foreign Application Priority Data
Feb. 19, 2021 (EP) ..................................... 21158294

(51) Int. Cl.
*H04W 4/50* (2018.01)
*H04W 4/60* (2018.01)
*H04W 24/10* (2009.01)
*H04W 84/04* (2009.01)

(52) U.S. Cl.
CPC ............... *H04W 4/50* (2018.02); *H04W 4/60* (2018.02); *H04W 24/10* (2013.01); *H04W 84/04* (2013.01)

(58) Field of Classification Search
None
See application file for complete search history.

(56) References Cited

U.S. PATENT DOCUMENTS

| | | | |
|---|---|---|---|
| 2020/0127916 A1 | 4/2020 | Krishan | |
| 2020/0267214 A1 | 8/2020 | Yang | |
| 2021/0176649 A1* | 6/2021 | Rahman | H04L 41/40 |
| 2022/0247678 A1* | 8/2022 | Atwal | H04L 45/645 |

FOREIGN PATENT DOCUMENTS

| | | |
|---|---|---|
| WO | 2019/219219 A1 | 11/2019 |
| WO | 2021/013321 A1 | 1/2021 |
| WO | 2021/018460 A1 | 2/2021 |

OTHER PUBLICATIONS

3GPP TS 28.552 V17.1.0 (Dec. 2020), Technical Specification, 3rd Generation Partnership Project; Technical Specification Group Services and System Aspects; Management and orchestration; 5G performance measurements (Release 17), Dec. 2020.

(Continued)

*Primary Examiner* — Walter J Divito
(74) *Attorney, Agent, or Firm* — Barta Jones, PLLC

(57) ABSTRACT

A technique, comprising: creating at a management plane of a communication network a register of services and/or a register of producers of services in the communication network; and based on at least one of the registers, providing to a consumer information about one or more producers providing services associated with one or more service attributes indicated by the consumer and/or information about one or more services associated with one or more service attributes indicated by the consumer.

16 Claims, 4 Drawing Sheets

(56) References Cited

OTHER PUBLICATIONS

3GPP TS 28.550 V16.7.0 (Dec. 2020), Technical Specification, 3rd Generation Partnership Project; Technical Specification Group Services and System Aspects; Management and orchestration; Performance assurance (Release 16), Dec. 2020.
3GPP TS 28.531 V16.8.0 (Dec. 2020), Technical Specification, 3rd Generation Partnership Project; Technical Specification Group Services and System Aspects; Management and orchestration; Provisioning; (Release 16), Dec. 2020.
3GPP TS 28.511 V16.0.0 (Jul. 2020), Technical Specification, 3rd Generation Partnership Project; Technical Specification Group Services and System Aspects; Telecommunication Management; Configuration Management (CM) for mobile networks that include virtualized network functions; Procedures (Release 16), Jul. 2020.
3GPP TS 28.512 V16.0.0 (Jul. 2020), Technical Specification, 3rd Generation Partnership Project; Technical Specification Group Services and System Aspects; Telecommunication Management; Configuration Management (CM) for mobile networks that include virtualized network functions; Stage 2 (Release 16), Jul. 2020.
3GPP TS 28.554 V17.1.1 (Dec. 2020), Technical Specification, 3rd Generation Partnership Project; Technical Specification Group Services and System Aspects; Management and orchestration; 5G end to end Key Performance Indicators (KPI) (Release 17), Dec. 2020.
3GPP TS 28.545 V16.1.0 (Sep. 2020), Technical Specification, 3rd Generation Partnership Project; Technical Specification Group Services and System Aspects; Management and orchestration; Fault Supervision (FS); (Release 16), Sep. 2020.
3GPP TR 28.809 V1.1.0 (Nov. 2020), Technical Report, 3rd Generation Partnership Project; Technical Specification Group Services and System Aspects; Management and orchestration; Study on enhancement of Management Data Analytics (MDA) (Release 17), Nov. 2020.
3GPP TS 29.510 V17.0.0 (Dec. 2020), Technical Specification, 3rd Generation Partnership Project; Technical Specification Group Core Network and Terminals; 5G System; Network Function Repository Services; Stage 3 (Release 17), Dec. 2020.
"3rd Generation Partnership Project; Technical Specification Group Services and System Aspects; Architecture enhancements for 5G System (5GS) to support network data analytics services (Release 16)", 3GPP TS 23.288, V16.6.0, Dec. 2020, pp. 1-67.
"3rd Generation Partnership Project; Technical Specification Group Services and System Aspects; Study of Enablers for Network Automation for 5G (Release 16)", 3GPP TR 23.791, V16.2.0, Jun. 2019, pp. 1-124.
"3rd Generation Partnership Project; Technical Specification Group Services and System Aspects; Management and orchestration; Generic management services; (Release 16)", 3GPP TS 28.532, V16.6.0, Dec. 2020, pp. 1-232.
"3rd Generation Partnership Project; Technical Specification Group Services and System Aspects; Management and orchestration of networks and network slicing; 5G Core Network (5GC) performance measurements and assurance data (Release 15)", 3GPP TS 28.553, V0.4.0, Jul. 2018, pp. 1-14.
"Zero-touch network and Service Management (ZSM); Reference Architecture", ETSI GS ZSM 002, V1.1.1, Aug. 2019, pp. 1-80.
"3rd Generation Partnership Project; Technical Specification Group Services and System Aspects; Telecommunication management; Generic Network Resource Model (NRM) Integration Reference Point (IRP); Information Service (IS) (Release 16)", 3GPP TS 28.622, V16.6.0, Dec. 2020, pp. 1-55.
"3rd Generation Partnership Project; Technical Specification Group Services and System Aspects Management and orchestration; Architecture framework (Release 16)", 3GPP TS 28.533, V16.6.0, Dec. 2020, pp. 1-30.
Extended European Search Report received for corresponding European Patent Application No. 21158294.5, dated Aug. 9, 2021, 9 pages.
"3rd Generation Partnership Project; Technical Specification Group Services and System Aspects; System Architecture for the 5G System; Stage 2 (Release 15)", 3GPP TS 23.501, V1.4.0, Sep. 2017, pp. 1-151.
Office Action received for corresponding European Patent Application No. 21158294.5, dated Jun. 5, 2024, 7 pages.

* cited by examiner

METHOD AND APPARATUS FOR USE IN COMMUNICATION NETWORKS HAVING CONTROL AND MANAGEMENT PLANES

TECHNICAL FIELD

The present disclosure relates to apparatus, a method, and a computer program and in particular but not exclusively to apparatus, methods and computer programs for use in communication networks having control and management planes.

BACKGROUND

A communication network may comprise, in addition to the user plane, control and management planes at which producers produce management services.

SUMMARY

A method, comprising: creating at a management plane of a communication network a register of services and/or a register of producers of services in the communication network; and based on at least one of the registers, providing to a consumer information about one or more producers providing services associated with one or more service attributes indicated by the consumer and/or information about one or more services associated with one or more service attributes indicated by the consumer.

The providing may comprise providing the information in response to a request from the consumer for information about one or more producers of services already registered and/or information about one or more services already registered.

The method may comprise receiving from the consumer a subscription request indicating the one or more service attributes; and the providing may comprise notifying the consumer of one or more producers registered after receiving the subscription request from the consumer and/or notifying the consumer of one or more services registered after receiving the subscription request from the consumer.

The one or more service attributes may comprise an attribute indicating a related function at the control plane of the communication network.

The producers of services may comprise one or more producers at the control plane of the communication network, such as a network data analytics function.

The producers may comprise one or more producers of management services at the management plane of the communication network.

The consumer may comprise a function at the control plane or management plane of the communication network.

A method comprising: directing a request to a producer, at a management plane of a communication network, of a register of services and/or a register of producers of services in the communication network, wherein the request indicates one or more service attributes; and receiving from the register producer information about one or more producers in the communication network of services associated with the one or more service attributes indicated by the consumer, and/or information about one or more services associated with the one or more service attributes indicated by the consumer.

The request may comprise a request for information about one or more producers already registered and/or information about one or more services already registered.

The request may be a subscription request to be notified of one or more producers registered after the subscription request, and/or of one or more services registered after the subscription request.

The one or more service attributes may comprise an attribute indicating a related function at the control plane of the communication network.

The one or more producers may include one or more producers at the control plane of the communication network and/or one or more producers at the management plane of the communication network.

The one or more producers at the control plane may comprise a network data analytics function.

The request may be from a function of the control or management planes of the communication network.

The request may be from a function at one hierarchical layer of the management plane, and the method may comprise receiving information about one or more producers at another hierarchical layer of the management plane.

A method, comprising: creating at a control plane of a communication network a register of services including one or more management services and/or a register of producers of services including one or more producers of management services at a management plane of the communication network; and providing to a consumer information identifying one or more producers in the communication network of one or more services associated with one or more service attributes indicated by the consumer, and/or information identifying one or more services associated with one or more service attributes indicated by the consumer.

The management services may be associated with one or more control plane functions included in the register.

The providing may comprise providing the information in response to a request from the consumer for information about one or more producers of services already registered, and/or information about one or more services already registered.

The method may comprise receiving from the consumer a subscription request indicating the one or more service attributes; and the providing may comprise notifying the consumer of one or more producers registered after receiving the subscription request from the consumer, and/or notifying the consumer of one or more services registered after receiving the subscription request from the consumer.

The one or more service attributes may comprise an attribute indicating a related function at the control plane of the communication network.

The register of producers may also include producers of services at the control plane of the communication network.

The consumer may comprise a function of the control plane or management plane of the communication network.

The consumer may be a radio intelligent controller for an open radio access network.

A method comprising: directing a request to a producer, at a control plane of a communication network, of a register of services including at least one management service and/or a register of producers of services including at least one producer of a management service at a management plane of the communication network, wherein the request indicates one or more service attributes; and receiving from the register producer information about one or more producers at a management plane of the communication network of management services associated with the indicated one or more service attributes, and/or information about one or more management services associated with the indicated one or more service attributes.

The one or more management services may be associated with one or more control plane functions included in the register.

The request may comprise a request for information about one or more producers already registered, and/or information about one or more services already registered.

The request may be a subscription request to be notified of one or more producers registered after the subscription request, and/or to be notified of one or more services registered after the subscription request.

The one or more service attributes may comprise an attribute indicating a related function at the control plane of the communication network.

The receiving further may comprise receiving information about one or more producers at the control plane of the communication network.

The request may be from a function of the control or management planes of the communication network.

The attributes may comprise one or more of: reporting capabilities; reporting type; reporting condition/trigger; type of data collected for service; geographical area; target scope; pre-processing options; analytics types, statistics or prediction; algorithm options; time ahead; prediction-frequency; confidence degree; and vendor information.

Apparatus comprising: means for creating at a management plane of a communication network a register of services and/or a register of producers of services in the communication network; and means for, based on at least one of the registers, providing to a consumer information about one or more producers providing services associated with one or more service attributes indicated by the consumer and/or information about one or more services associated with one or more service attributes indicated by the consumer.

The providing may comprise providing the information in response to a request from the consumer for information about one or more producers of services already registered and/or information about one or more services already registered.

The apparatus may further comprise means for receiving from the consumer a subscription request indicating the one or more service attributes; and the providing may comprise notifying the consumer of one or more producers registered after receiving the subscription request from the consumer and/or notifying the consumer of one or more services registered after receiving the subscription request from the consumer.

The one or more service attributes may comprise an attribute indicating a related function at the control plane of the communication network.

The producers of services may comprise one or more producers at the control plane of the communication network, such as a network data analytics function.

The producers may comprise one or more producers of management services at the management plane of the communication network.

The consumer may comprise a function at the control plane or management plane of the communication network.

Apparatus comprising: means for directing a request to a producer, at a management plane of a communication network, of a register of services and/or a register of producers of services in the communication network, wherein the request indicates one or more service attributes; and means for receiving from the register producer information about one or more producers in the communication network of services associated with the one or more service attributes indicated by the consumer, and/or information about one or more services associated with the one or more service attributes indicated by the consumer.

The request may comprise a request for information about one or more producers already registered and/or information about one or more services already registered.

The request may be a subscription request to be notified of one or more producers registered after the subscription request, and/or of one or more services registered after the subscription request.

The one or more service attributes may comprise an attribute indicating a related function at the control plane of the communication network.

The one or more producers may include one or more producers at the control plane of the communication network and/or one or more producers at the management plane of the communication network.

The one or more producers at the control plane may comprise a network data analytics function.

The request may be from a function of the control or management planes of the communication network.

The request may be from a function at one hierarchical layer of the management plane, and the method may comprise receiving information about one or more producers at another hierarchical layer of the management plane.

Apparatus comprising: means for creating at a control plane of a communication network a register of services including one or more management services and/or a register of producers of services including one or more producers of management services at a management plane of the communication network; and means for providing to a consumer information identifying one or more producers in the communication network of one or more services associated with one or more service attributes indicated by the consumer, and/or information identifying one or more services associated with one or more service attributes indicated by the consumer.

The management services may be associated with one or more control plane functions included in the register.

The providing may comprise providing the information in response to a request from the consumer for information about one or more producers of services already registered, and/or information about one or more services already registered.

The apparatus may further comprise means for receiving from the consumer a subscription request indicating the one or more service attributes; and the providing may comprise notifying the consumer of one or more producers registered after receiving the subscription request from the consumer, and/or notifying the consumer of one or more services registered after receiving the subscription request from the consumer.

The one or more service attributes may comprise an attribute indicating a related function at the control plane of the communication network.

The register of producers may also include producers of services at the control plane of the communication network.

The consumer may comprise a function of the control plane or management plane of the communication network.

The consumer may be a radio intelligent controller for an open radio access network.

Apparatus comprising: means for directing a request to a producer, at a control plane of a communication network, of a register of services including at least one management service and/or a register of producers of services including at least one producer of a management service at a management plane of the communication network, wherein the request indicates one or more service attributes; and means for receiving from the register producer information about one or more producers at a management plane of the communication network of management services associated with the indicated one or more service attributes, and/or information about one or more management services associated with the indicated one or more service attributes.

The one or more management services may be associated with one or more control plane functions included in the register.

The request may comprise a request for information about one or more producers already registered, and/or information about one or more services already registered.

The request may be a subscription request to be notified of one or more producers registered after the subscription request, and/or to be notified of one or more services registered after the subscription request.

The one or more service attributes may comprise an attribute indicating a related function at the control plane of the communication network.

The receiving further may comprise receiving information about one or more producers at the control plane of the communication network.

The request may be from a function of the control or management planes of the communication network.

The attributes may comprise one or more of: reporting capabilities; reporting type; reporting condition/trigger; type of data collected for service; geographical area; target scope; pre-processing options; analytics types, statistics or prediction; algorithm options; time ahead; prediction-frequency; confidence degree; and vendor information.

Apparatus comprising: at least one processor; and at least one memory including computer program code, the at least one memory and computer program code configured to, with the at least one processor, cause the apparatus to perform: creating at a management plane of a communication network a register of services and/or a register of producers of services in the communication network; and based on at least one of the registers, providing to a consumer information about one or more producers providing services associated with one or more service attributes indicated by the consumer and/or information about one or more services associated with one or more service attributes indicated by the consumer.

The providing may comprise providing the information in response to a request from the consumer for information about one or more producers of services already registered and/or information about one or more services already registered.

The at least one memory and computer program code may be configured to, with the at least one processor, cause the apparatus to receive from the consumer a subscription request indicating the one or more service attributes; and the providing may comprise notifying the consumer of one or more producers registered after receiving the subscription request from the consumer and/or notifying the consumer of one or more services registered after receiving the subscription request from the consumer.

The one or more service attributes may comprise an attribute indicating a related function at the control plane of the communication network.

The producers of services may comprise one or more producers at the control plane of the communication network, such as a network data analytics function.

The producers may comprise one or more producers of management services at the management plane of the communication network.

The consumer may comprise a function at the control plane or management plane of the communication network.

An apparatus comprising: at least one processor; and at least one memory including computer program code, the at least one memory and computer program code configured to, with the at least one processor, cause the apparatus to perform: directing a request to a producer, at a management plane of a communication network, of a register of services and/or a register of producers of services in the communication network, wherein the request indicates one or more service attributes; and receiving from the register producer information about one or more producers in the communication network of services associated with the one or more service attributes indicated by the consumer, and/or information about one or more services associated with the one or more service attributes indicated by the consumer.

The request may comprise a request for information about one or more producers already registered and/or information about one or more services already registered.

The request may be a subscription request to be notified of one or more producers registered after the subscription request, and/or of one or more services registered after the subscription request.

The one or more service attributes may comprise an attribute indicating a related function at the control plane of the communication network.

The one or more producers may include one or more producers at the control plane of the communication network and/or one or more producers at the management plane of the communication network.

The one or more producers at the control plane may comprise a network data analytics function.

The request may be from a function of the control or management planes of the communication network.

The request may be from a function at one hierarchical layer of the management plane, and the method may comprise receiving information about one or more producers at another hierarchical layer of the management plane.

An apparatus comprising: at least one processor; and at least one memory including computer program code, the at least one memory and computer program code configured to, with the at least one processor, cause the apparatus to perform: creating at a control plane of a communication network a register of services including one or more management services and/or a register of producers of services including one or more producers of management services at a management plane of the communication network; and providing to a consumer information identifying one or more producers in the communication network of one or more services associated with one or more service attributes indicated by the consumer, and/or information identifying one or more services associated with one or more service attributes indicated by the consumer.

The management services may be associated with one or more control plane functions included in the register.

The providing may comprise providing the information in response to a request from the consumer for information about one or more producers of services already registered, and/or information about one or more services already registered.

The at least one memory and computer program code may be configured to, with the at least one processor, cause the apparatus to receive from the consumer a subscription request indicating the one or more service attributes; and the providing may comprise notifying the consumer of one or more producers registered after receiving the subscription request from the consumer, and/or notifying the consumer of one or more services registered after receiving the subscription request from the consumer.

The one or more service attributes may comprise an attribute indicating a related function at the control plane of the communication network.

The register of producers may also include producers of services at the control plane of the communication network.

The consumer may comprise a function of the control plane or management plane of the communication network.

The consumer may be a radio intelligent controller for an open radio access network.

An apparatus comprising: at least one processor; and at least one memory including computer program code, the at least one memory and computer program code configured to, with the at least one processor, cause the apparatus to perform: directing a request to a producer, at a control plane of a communication network, of a register of services including at least one management service and/or a register of producers of services including at least one producer of a management service at a management plane of the communication network, wherein the request indicates one or more service attributes; and receiving from the register producer information about one or more producers at a management plane of the communication network of management services associated with the indicated one or more service attributes, and/or information about one or more management services associated with the indicated one or more service attributes.

The one or more management services may be associated with one or more control plane functions included in the register.

The request may comprise a request for information about one or more producers already registered, and/or information about one or more services already registered.

The request may be a subscription request to be notified of one or more producers registered after the subscription request, and/or to be notified of one or more services registered after the subscription request.

The one or more service attributes may comprise an attribute indicating a related function at the control plane of the communication network.

The receiving further may comprise receiving information about one or more producers at the control plane of the communication network.

The request may be from a function of the control or management planes of the communication network.

The attributes may comprise one or more of: reporting capabilities; reporting type; reporting condition/trigger; type of data collected for service; geographical area; target scope; pre-processing options; analytics types, statistics or prediction; algorithm options; time ahead; prediction-frequency; confidence degree; and vendor information.

Apparatus, comprising: circuitry for creating at a management plane of a communication network a register of services and/or a register of producers of services in the communication network; and circuitry, for based on at least one of the registers, providing to a consumer information about one or more producers providing services associated with one or more service attributes indicated by the consumer and/or information about one or more services associated with one or more service attributes indicated by the consumer.

Apparatus comprising: circuitry for directing a request to a producer, at a management plane of a communication network, of a register of services and/or a register of producers of services in the communication network, wherein the request indicates one or more service attributes; and circuitry for receiving from the register producer information about one or more producers in the communication network of services associated with the one or more service attributes indicated by the consumer, and/or information about one or more services associated with the one or more service attributes indicated by the consumer.

Apparatus comprising: circuitry for creating at a control plane of a communication network a register of services including one or more management services and/or a register of producers of services including one or more producers of management services at a management plane of the communication network; and circuitry for providing to a consumer information identifying one or more producers in the communication network of one or more services associated with one or more service attributes indicated by the consumer, and/or information identifying one or more services associated with one or more service attributes indicated by the consumer.

Apparatus comprising: circuitry for directing a request to a producer, at a control plane of a communication network, of a register of services including at least one management service and/or a register of producers of services including at least one producer of a management service at a management plane of the communication network, wherein the request indicates one or more service attributes; and circuitry for receiving from the register producer information about one or more producers at a management plane of the communication network of management services associated with the indicated one or more service attributes, and/or information about one or more management services associated with the indicated one or more service attributes.

A computer readable medium comprising program instructions stored thereon for performing: creating at a management plane of a communication network a register of services and/or a register of producers of services in the communication network; and based on at least one of the registers, providing to a consumer information about one or more producers providing services associated with one or more service attributes indicated by the consumer and/or information about one or more services associated with one or more service attributes indicated by the consumer.

A computer readable medium comprising program instructions stored thereon for performing: directing a request to a producer, at a management plane of a communication network, of a register of services and/or a register of producers of services in the communication network, wherein the request indicates one or more service attributes; and receiving from the register producer information about one or more producers in the communication network of services associated with the one or more service attributes indicated by the consumer, and/or information about one or more services associated with the one or more service attributes indicated by the consumer.

A computer readable medium comprising program instructions stored thereon for performing: creating at a control plane of a communication network a register of services including one or more management services and/or a register of producers of services including one or more producers of management services at a management plane of the communication network; and providing to a consumer information identifying one or more producers in the communication network of one or more services associated with one or more service attributes indicated by the consumer, and/or information identifying one or more services associated with one or more service attributes indicated by the consumer.

A computer readable medium comprising program instructions stored thereon for performing: directing a request to a producer, at a control plane of a communication network, of a register of services including at least one management service and/or a register of producers of services including at least one producer of a management service at a management plane of the communication network, wherein the request indicates one or more service attributes; and receiving from the register producer information about one or more producers at a management plane of the communication network of management services associated with the indicated one or more service attributes, and/or information about one or more management services associated with the indicated one or more service attributes.

A non-transitory computer readable medium comprising program instructions stored thereon for performing: creating at a management plane of a communication network a register of services and/or a register of producers of services in the communication network; and based on at least one of the registers, providing to a consumer information about one or more producers providing services associated with one or more service attributes indicated by the consumer and/or information about one or more services associated with one or more service attributes indicated by the consumer.

A non-transitory computer readable medium comprising program instructions stored thereon for performing: directing a request to a producer, at a management plane of a communication network, of a register of services and/or a register of producers of services in the communication network, wherein the request indicates one or more service attributes; and receiving from the register producer information about one or more producers in the communication network of services associated with the one or more service attributes indicated by the consumer, and/or information about one or more services associated with the one or more service attributes indicated by the consumer.

A non-transitory computer readable medium comprising program instructions stored thereon for performing: creating at a control plane of a communication network a register of services including one or more management services and/or a register of producers of services including one or more producers of management services at a management plane of the communication network; and providing to a consumer information identifying one or more producers in the communication network of one or more services associated with one or more service attributes indicated by the consumer, and/or information identifying one or more services associated with one or more service attributes indicated by the consumer.

A non-transitory computer readable medium comprising program instructions stored thereon for performing: directing a request to a producer, at a control plane of a communication network, of a register of services including at least one management service and/or a register of producers of services including at least one producer of a management service at a management plane of the communication network, wherein the request indicates one or more service attributes; and receiving from the register producer information about one or more producers at a management plane of the communication network of management services associated with the indicated one or more service attributes, and/or information about one or more management services associated with the indicated one or more service attributes.

A computer program comprising computer executable code which when run on at least one processor is configured to cause an apparatus at least to: create at a management plane of a communication network a register of services and/or a register of producers of services in the communication network; and based on at least one of the registers, provide to a consumer information about one or more producers providing services associated with one or more service attributes indicated by the consumer and/or information about one or more services associated with one or more service attributes indicated by the consumer.

A computer program comprising computer executable code which when run on at least one processor is configured to cause an apparatus at least to: direct a request to a producer, at a management plane of a communication network, of a register of services and/or a register of producers of services in the communication network, wherein the request indicates one or more service attributes; and receive from the register producer information about one or more producers in the communication network of services associated with the one or more service attributes indicated by the consumer, and/or information about one or more services associated with the one or more service attributes indicated by the consumer.

A computer program comprising computer executable code which when run on at least one processor is configured to cause an apparatus at least to: create at a control plane of a communication network a register of services including one or more management services and/or a register of producers of services including one or more producers of management services at a management plane of the communication network; and provide to a consumer information identifying one or more producers in the communication network of one or more services associated with one or more service attributes indicated by the consumer, and/or information identifying one or more services associated with one or more service attributes indicated by the consumer.

A computer program comprising computer executable code which when run on at least one processor is configured to cause an apparatus at least to: direct a request to a producer, at a control plane of a communication network, of a register of services including at least one management service and/or a register of producers of services including at least one producer of a management service at a management plane of the communication network, wherein the request indicates one or more service attributes; and receive from the register producer information about one or more producers at a management plane of the communication network of management services associated with the indicated one or more service attributes, and/or information about one or more management services associated with the indicated one or more service attributes.

A computer program comprising instructions which, when the program is executed by a computer, cause the computer to carry out any of the methods described above.

A non-volatile tangible memory medium comprising program instructions stored thereon for performing any of the methods described above.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Some example embodiments will now be described in further detail, by way of example only, with reference to the following examples and accompanying drawings, in which.

DETAILED DESCRIPTION

The following detailed description focusses partly on the example of a 5G system having a service-based architecture (SBA) and service-based management architecture (SBMA) for the control and management planes, but the technique is also applicable to other systems.

In the example embodiments, management functions at the management plane are used to set up and manage individual or groups of network functions at the control plane. The operations of the management functions at the management plane may comprise one or more of creating, installing, arranging, deactivating, and co-ordinating network function(s) at the control plane according to the resources available. Functions of the management plane may include e.g. fault management, performance management and configuration management. The operations of the network functions at the control plane include instructing functions at the user plane with respect to processing packets, frames etc. at the user plane.

Both the control and management planes may be offered by the same operator. Alternatively, the management and control planes may be hosted by different operators or different administrative domains, using appropriate access control mechanisms such as e.g. authentication and authorization).

In these example embodiments, the control and management planes refer to the control and management planes of a single domain of a communication network. A domain is part of the communication network that can be managed individually but is linked to other domains of the communication network for capacity planning, service management, correlation, etc. Examples of communication network domains are a core domain, a radio access network (RAN) domain, and a combined core/RAN domain.

Figure 1:
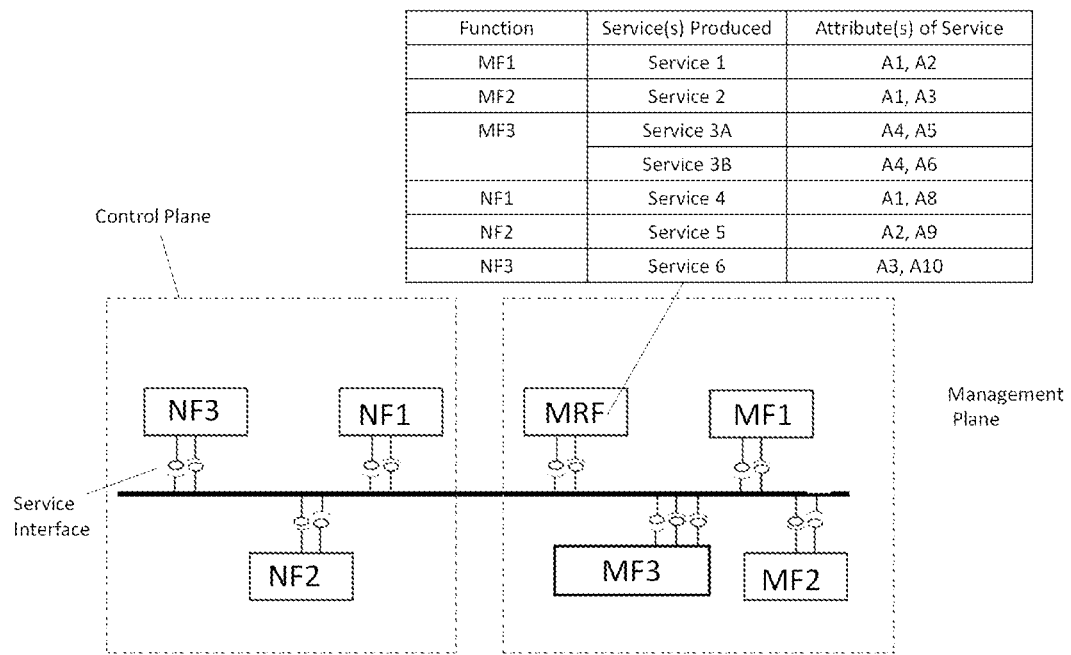
FIG. 1 shows a representation of an example of interacting service producers/consumers in control and management planes according to some example embodiments.
Figure 2:
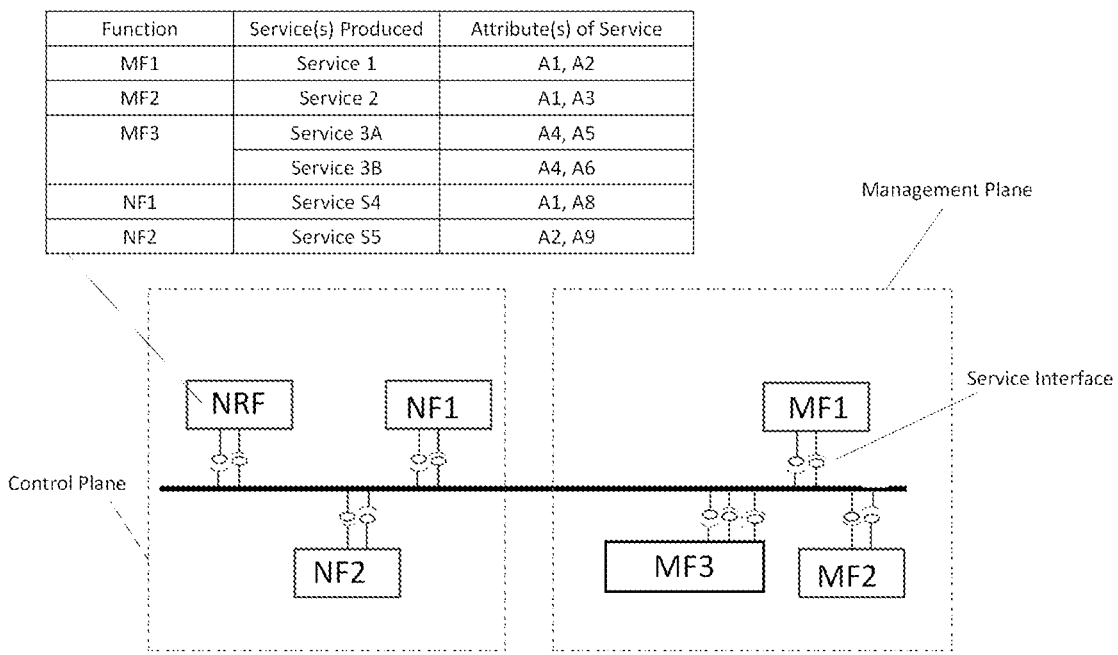
FIG. 2 shows a representation of another example of interacting service producers/consumers in control and management planes according to some example embodiments.

FIGS. 1 and 2 show representations of collections of functions at the control and management planes according to example embodiments. Each function can consume the one or more services produced by each of the other functions by means of service interfaces. An individual function may produce a single service or a plurality of services.

The collection of functions shown in FIG. 1 includes at least a repository function (MRF) at the management plane providing a register of functions at (at least) the management plane; and the collection of functions shown in FIG. 2 includes at least a repository function (NRF) at the control plane providing a register of functions at the control plane and at least one function at the management plane.

Figure 3:
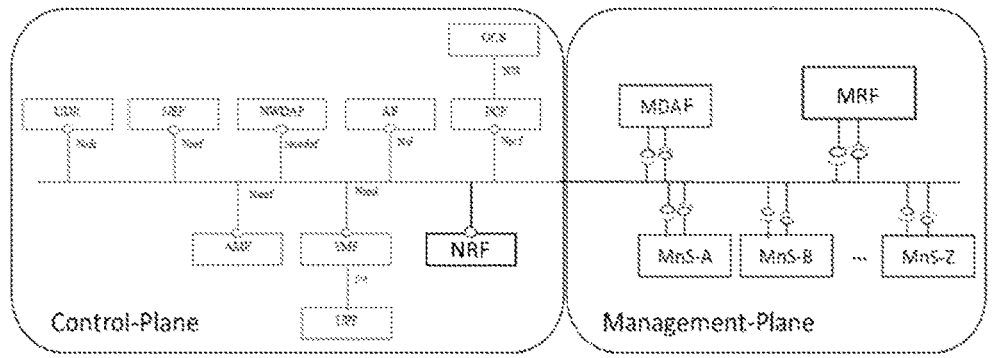
FIG. 3 shows a representation of one example of the interacting service producer/consumers of FIGS. 1 and 2.

In one example embodiment, such as that shown in the example of FIG. 3 for a 3GPP 5GS core domain, the collection of functions includes repository functions at both the control and management planes. The two repository functions may have a direct interface thus enabling cross-plane discovery. The repository function at the control plane may send a discovery request to the repository function at the management plane, and vice versa.

According to one example, both functions at the control plane and functions at the management plane can directly register the attributes of the services they produce at e.g. the repository function at the control plane.

As shown in FIG. 3, examples of functions at the control plane include e.g. a unified data repository (UDR), a network exposure function (NEF), a network data analytics function (NWDAF), one or more application functions (AF), a policy control function (PCF), an access and mobility management function (AMF), and a session management function (SMF), all operating according to one or more 3GPP protocols; and examples of functions at the management plane include e.g. a management data analytics function (MDAF) and other management functions operating according to one or more 3GPP protocols.

Some examples of management services produced by functions at the management plane include: performance management such as PM defined by 3GPP TS 28.552/TS 28.550; fault management; configuration management and alarms such as those defined by 3GPP TS 28.531, TS 28.511/TS 28.512; UE trace—minimisation of drive test (MDT); end-to-end key performance indicators such as KPIs defined by 3GPP TS 28.554; provisioning services; and fault supervision such as that defined by 3GPP TS 28.545.

According to one example, the register at the repository function includes for each registered function: the identity/address (provided e.g. by IP@, URI) and one or more attributes (e.g. list of PM counters, periodicity) for each management service produced by the function. The attributes may for example comprise attributes defined in 3GPP specifications such as TS 28.552 and TS28.554).

According to one example, one or more functions included in the register at the repository function include a management data analytics function (MDAF) (such as one operating according to a 3GPP protocol) producing management data analytics services (MDAS) at the management plane. The register entry for such a MDAF may include: (i) Identity/address (provided e.g. by IP@, URI) of the function; (ii) "per use case" specific attributes, such as those defined in a 3GPP specification such as TR 28.809; (iii) an analytic type (such as e.g. those defined in a 3GPP specification such as TR 28.809); (iv) information about the data required as input by the MDAF; and (vi) information about the output (analytic report) of the data produced by the service of the MDAF. A management service provided by a MDAF may be associated with one or more of the following specific attributes:

Reporting Capabilities: Time Scheduling (e.g. periodic, historical),
Reporting Type: (e.g. file, streaming, notification),
Condition based/Trigger (e.g. threshold, area of interest),
Type of Data Collected (e.g. percentage of UEs, average/distribution);
Geographical Area;
Scope (Target): e.g. single UE, group of UEs, S-NSSAI, Area of interest;
Pre-processing options including aggregation, filtering etc.;

Analytics types, statistics or prediction: e.g. analytic-type=mobility-prediction;

Algorithm options: In case of artificial intelligence (AI)/machine learning (ML)/Linear Regression/Reinforcement Learning, etc.), other attributes may include, for example: time ahead, prediction-frequency, confidence degree, vendor information.

The attributes mapped to a management service of a management plane function may comprise an indication of one or more other functions with which the management service is associated. A consuming function can discover a function producing relevant management services by directing to the repository function a request specifying one or more function types and attributes that the consuming function associates with the management service. For example, the consuming function may be a network data analytics function (NWDAF) and may require a management service (such as a user equipment (UE) trace) with certain attributes, e.g. real-time, which is associated with an access and mobility function (AMF) at the control plane in the example of FIG. 3. The NWDAF may direct a request to the repository function for information about management services that are associated with the AMF, and receive the requested information from the repository function.

According to one example, the repository function at the control plane maintains a register of management services produced by management functions associated with network functions. According to one example, the repository function at the control plane maintains a register of management services produced at the management-plane side of entities that also produce network services at a control-plane side thereof.

The attributes used in the above-described techniques may, for example, be based on those defined in table 6.1.6.2.2-1 in 3GPP TS 29.510 with e.g. one or more of the examples of enhancements indicated below.

a) the description for the attribute "amfinfo" may be modified to refer to MnSInfo as part of the specific data for the AMF;

b) the description for the attribute "smfinfo" may be modified to refer to MnSInfo as part of the specific data for the SMF;

c) the description for the attribute "upfinfo" may be modified to refer to MnSInfo as part of the specific data for the UPF;

d) a new attribute may be defined to facilitate the discovery of a management service related to a data collection coordination function (DCCF) and providing specific data for an enhanced trace collection entity (eTCE) (geo-area, real-time, non-real time, near-real time ... ).

e) a new attribute may be defined to facilitate the discovery of a management service producing specific data for a MDAS producer, with reference to type, geo-area, analytics type, reporting, algorithm type ... ) in the description of the attribute.

For example, these enhancements can facilitate the discovery, by a network analytics data function at the control plane, of one or more functions producing data analytics services at the management plane, and vice versa.

Figure 4:
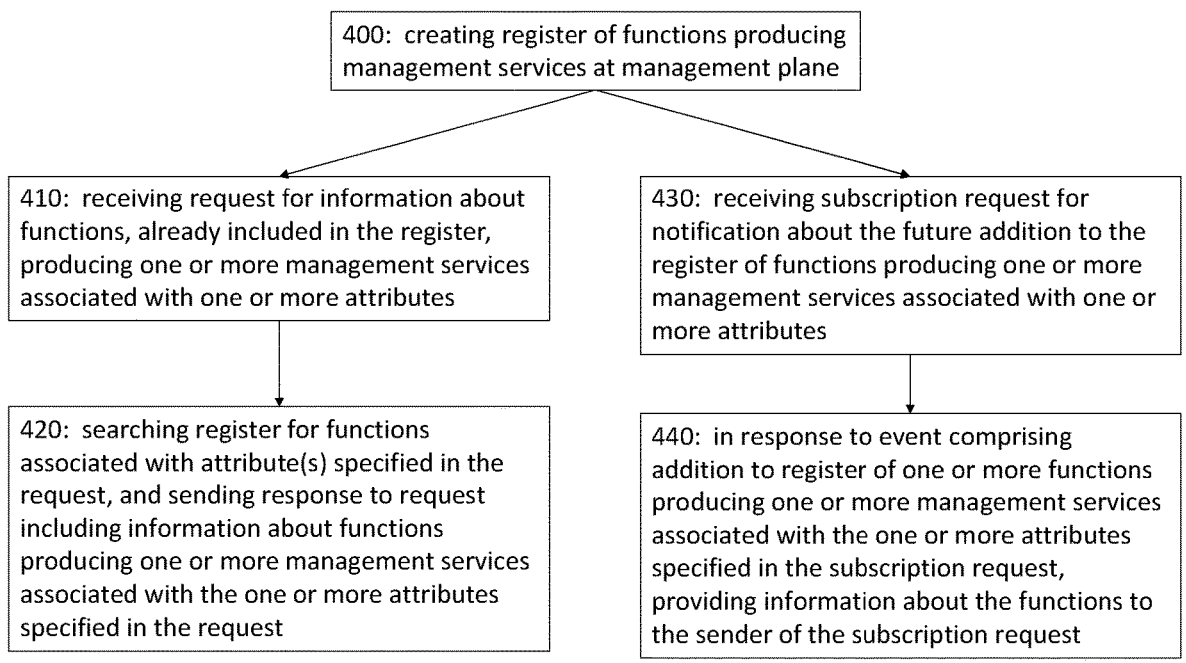
FIG. 4 shows a representation of operations of a register producer according to some example embodiments.

FIG. 4 shows a representation of operations at the management plane repository function (MRF) in FIG. 1 or FIG. 3 and/or the control plane repository function (NRF) in FIG. 2 or FIG. 3. The repository function creates (STEP 400) a register of functions at both the control and management planes, including attributes associated with the one or more services (e.g. management services produced by management plane functions) produced by each registered function. As new functions are added to the control and/or management planes of the network domain, the register is updated to include the new functions. FIGS. 1 and 2 show simple abstract examples of registers, in which each service of each registered function (MF1-3, NF1-3) is mapped to one or more attributes (A1-A10). As indicated in these simple examples, one or more functions may produce more than one service, wherein each service may be associated with a different attribute or different set of attributes.

For the example of a repository function at the control plane, the management services registered at the control plane repository function are services associated with control plane functions registered at the control plane repository function.

The repository function receives (STEP 410 or STEP 430), from a consuming function, a request for information about functions producing services associated with one or more attributes, and the repository function provides (STEP 420 or STEP 440) information to the consumer function about other functions producing services associated with the attributes specified in the request.

According to one example, the request received from the consuming function may take the form of a request for information about producers already included in the register (STEP 410). This request triggers the repository function to search the register for functions producing the services associated with the attributes indicated in the request, and to respond (STEP 420) to the request with information indicating one or more functions providing services associated with the attributes specified in the request.

According to another example, the request received from the consuming function may take the form of a subscription request specifying one or more service attributes (STEP 430). This subscription request triggers the repository function to notify (STEP 440) the consuming function whenever a function producing one or more services associated with the one or more service attributes is added to the register.

Figure 5:
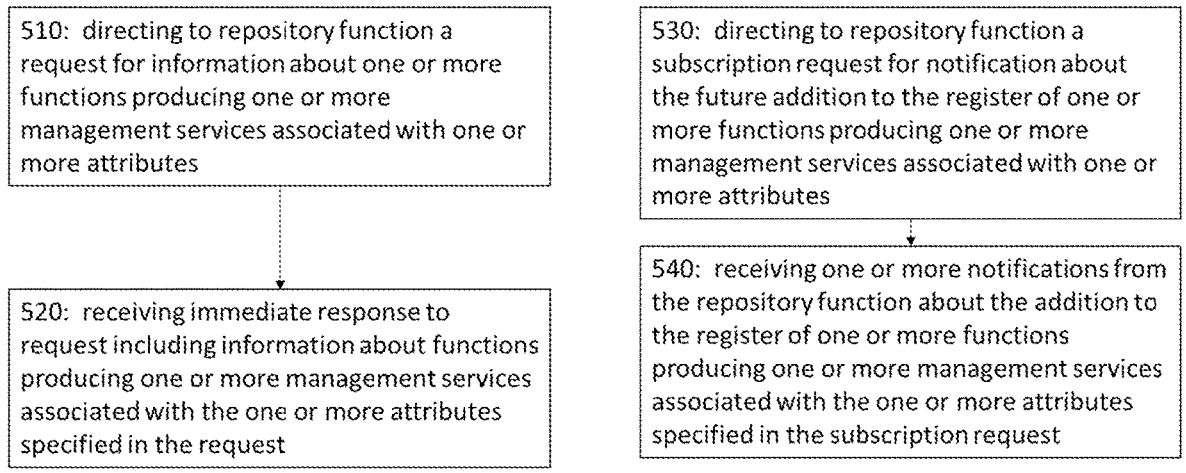
FIG. 5 shows a representation of operations of a consumer of a register service according to some example embodiments.

FIG. 5 shows a representation of the operations at a function consuming the registry service produced by the management plane repository function in FIG. 1 or FIG. 3, or produced by the control plane repository function in FIG. 2 or FIG. 3. The consuming function directs a request (STEP 510 or STEP 530) to the repository function for information about functions producing management services, and the request specifies one or more service attributes. The request may, for example, be a request for an immediate response including information about producers already included in the register (STEP 510), or may be a subscription request requesting notification of events such as the addition to the register of one more functions producing management services associated with the one or more attributes specified in the subscription request (STEP 530). In either example, the consuming function receives the request information either by immediate response (STEP 520) or by one or more later notifications in response to a relevant event at the repository function (STEP 540).

The above-described example embodiments facilitate cross-plane service registration/creation, cross-plane service discovery, and cross-plane service consumption.

For example, the above-described example embodiments facilitate one or more of: (i) discovery by a management data analytics function at the management plane of services produced by core network data analytics function (CN-NWDAF) at the control plane; (ii) discovery by a core network data analytics function (CN-NWDAF) of functions at the management plane producing management data analytics services (MDAS); and (iii) discovery by functions producing management services at the management plane of other functions producing management services at the same hierarchical level of the management plane or at a different hierarchical level of the management plane.

For example, the above-described example embodiments facilitate the notification to a service-consuming function (e.g. CN-NWDAF or MDAF) of the addition of new functions producing management services relevant to that service-consuming function.

For example, the above-described example embodiments facilitate delivery, by a network data analytics function (NWDAF) at the control plane, of more complex and accurate predictions, by facilitating the discovery of management plane functions producing OAM analytics related to e.g. RAN performance and fault management. For the example of a vehicle-to-everything (V2X) use: providing an V2X AF with advice about adjusting the level of automation (LoA) is facilitated by the discovery by the NWDAF of management plane functions providing management data analytics about e.g. network load conditions and RAN analytics.

For example, the above-described example embodiments facilitate management data analytics service (MDAS) producers at the management/OAM plane discovering control plane analytics. For example, information about quality of experience (QoE) enhances the capability of a MDAS producer to trigger resource adjustments if a slice related agreement/specification (SLA/SLS) are not satisfied. A MDAS producer can assist e.g. a NSMF or NSSMF to scale up/down resources or relocate control plane functions.

For example, the above-described embodiments avoid the need for a function to be preconfigured in order be able to consume a management service produced by another function. The above-described embodiments avoid the need for the consuming function to know a priori the address of the function producing a related management service. The above-described example embodiments avoid the need for a consuming function to rely on a domain name server to identify the IP address of a function producing a related management service.

For example, the above-described embodiments can also facilitate the operation of an open RAN (O-RAN) environment, with interoperability between different vendors happening over a set of defined interfaces. In an environment involving a Non-RealTime RIC (RAN Intelligent Controller) issuing A1 policies per UE/per group of UEs/per network slice assistance information (Single-Network Slice Selection Assistance Information (5-NSSAI)), the above-described embodiments can facilitate the co-ordination of policies with core network policy control functions and session management functions, without requiring pre-configuration and manual coordination between the radio access network and the core network, and thereby facilitating automation. The above-described embodiments can also facilitate the provision for QoS/QoE use cases of analytics from a core network NWDAF to multi-vendor applications running in Non-RT RIC (named rAPPs whose output can be A1 policies). The above is also applicable to Near-Real Time Release (RTR) RIC, which issues E2 policies and supports multi-vendor applications, named xAPPs.

According to one example embodiment, the register at the repository function (NRF and/or MRF) includes a register of services that can be requested at the repository function. A consumer may use the register to discover one or more such services, without requiring information about the producer of the service.

Figure 6:
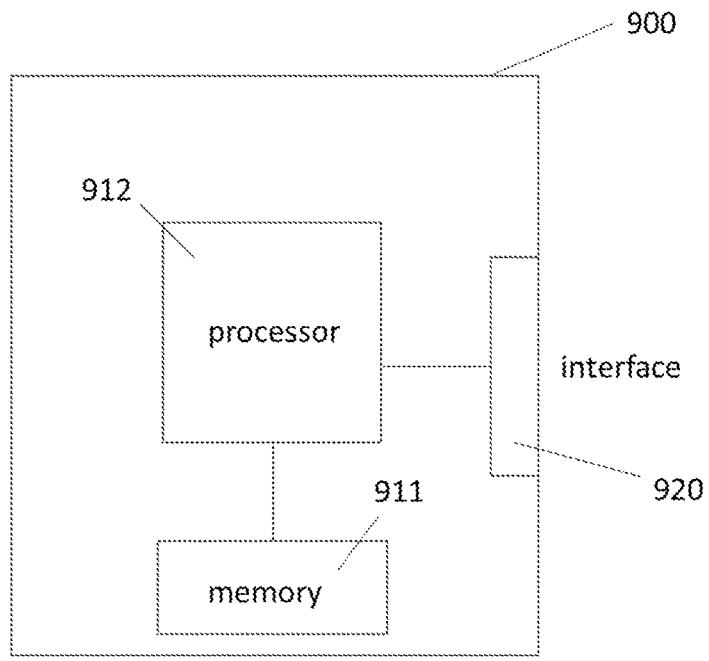
FIG. 6 shows a representation of an apparatus for implementing operations of a register service producer and/or consumer according to some example embodiments.

FIG. 6 illustrates an example of an apparatus 900 for implementing the operations of the repository function in the embodiments described above, or for implementing the operations of a function consuming the services of the repository function in the embodiments described above.

The apparatus may comprise at least one processor 912 coupled to one or more interfaces 920 to other apparatus implementing one or more other functions. The at least one processor 912 may be coupled to at least one memory 911. The at least one processor 912 may be configured to execute an appropriate software code 915 to perform the operations described above. The software code 915 may be stored in the memory 911.

Figure 7:
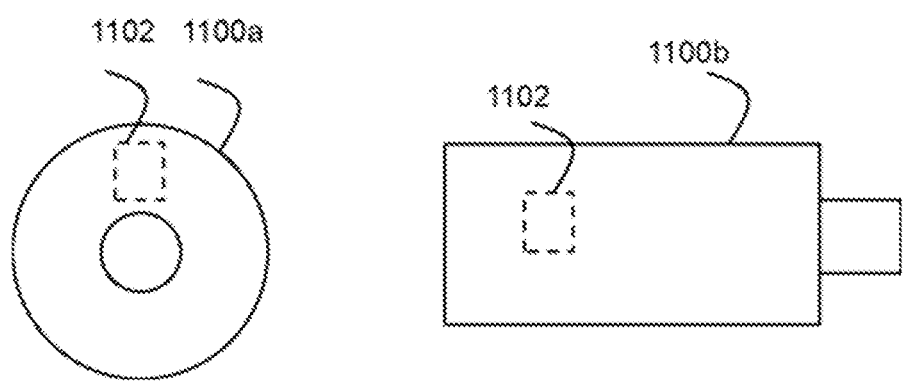
FIG. 7 shows a representation of non-volatile memory media.

FIG. 7 shows a schematic representation of non-volatile memory media 1100a (e.g. computer disc (CD) or digital versatile disc (DVD)) and 1100b (e.g. universal serial bus (USB) memory stick) storing instructions and/or parameters 1102 which when executed by a processor allow the processor to perform one or more of the steps of the methods described previously.

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A method, comprising:
creating, at a management plane of a communication network, a register of services and a register of producers of services in the communication network, wherein the management plane comprises one or more management functions for setting up and managing individual or groups of network functions at a control plane of the communication network, and wherein a request is from a function at one hierarchical layer of the management plane;
receiving a request from a function at one hierarchical layer of the management plane;
receiving information about one or more producers at another hierarchical layer of the management plane; and
based on at least one of the registers and the request from the function at one hierarchical layer of the management plane, providing to a consumer, information about one or more producers providing services associated with service attributes indicated by the consumer and information about one or more services associated with the service attributes indicated by the consumer, wherein the service attributes comprise reporting capabilities, periodic and historical time scheduling, file reporting type, streaming reporting type, notification reporting type, reporting condition/trigger, type of data collected for service comprising a percentage of user equipment and average/distribution, geographical area, target scope of a single user equipment, pre-processing options including aggregation and filtering, analytics types, statistics or prediction, algorithm options between artificial intelligence and machine learning, time ahead, prediction-frequency, confidence degree, and vendor information.

2. A method, comprising:
directing a request to a producer, at a management plane of a communication network, of a register of services and a register of producers of services in the communication network, wherein the request indicates service attributes, wherein the request is from a function at one hierarchical layer of the management plane, wherein the management plane comprises one or more management functions for setting up and managing individual or groups of network functions at a control plane of the communication network, and wherein the service attributes comprise reporting capabilities, periodic and historical time scheduling, file reporting type, streaming reporting type, notification reporting type, reporting condition/trigger, type of data collected for service comprising a percentage of user equipment and average/distribution, geographical area, target scope of a single user equipment, pre-processing options including aggregation and filtering, analytics types, statistics or prediction, algorithm options between artificial intelligence and machine learning, time ahead, prediction-frequency, confidence degree, and vendor information;
receiving information about one or more producers at another hierarchical layer of the management plane; and
receiving from the register producer information about one or more producers in the communication network of services associated with the one or more service attributes indicated by the consumer, and/or information about one or more services associated with the one or more service attributes indicated by the consumer.

3. A method, comprising:
creating at a control plane of a communication network a register of services including one or more management services and a register of producers of services including one or more producers of management services at a management plane of the communication network, wherein the management plane comprises one or more management functions for setting up and managing individual or groups of network functions at a control plane of the communication network, and wherein a request is from a function at one hierarchical layer of the management plane,
receiving information about one or more producers at another hierarchical layer of the management plane; and
providing to a consumer information identifying one or more producers in the communication network of one or more services associated with service attributes indicated by the consumer and information identifying one or more services associated with the service attributes indicated by the consumer, wherein the management plane comprises one or more management functions for setting up and managing individual or groups of network functions at a control plane of the communication network, and wherein the service attributes comprise reporting capabilities, periodic and historical time scheduling, file reporting type, streaming reporting type, notification reporting type, reporting condition/trigger, type of data collected for service comprising a percentage of user equipment and average/distribution, geographical area, target scope of a single user equipment, pre-processing options including aggregation and filtering, analytics types, statistics or prediction, algorithm options between artificial intelligence and machine learning, time ahead, prediction-frequency, confidence degree, and vendor information.

4. A method, comprising:
directing a request to a producer, at a control plane of a communication network, of a register of services including at least one management service and a register of producers of services including at least one producer of a management service at a management plane of the communication network, wherein the request indicates service attributes, wherein the management plane comprises one or more management functions for setting up and managing individual or groups of network functions at a control plane of the communication network, wherein the request is from a function at one hierarchical layer of the management plane, and wherein the service attributes comprise reporting capabilities, periodic and historical time scheduling, file reporting type, streaming reporting type, notification reporting type, reporting condition/trigger, type of data collected for service comprising a percentage of user equipment and average/distribution, geographical area, target scope of a single user equipment, pre-processing options including aggregation and filtering, analytics types, statistics or prediction, algorithm options between artificial intelligence and machine learning, time ahead, prediction-frequency, confidence degree, and vendor information;

receiving information about one or more producers at another hierarchical layer of the management plane; and receiving from the register producer information about one or more producers at a management plane of the communication network of management services associated with the indicated one or more service attributes, and/or information about one or more management services associated with the indicated one or more service attributes.

5. The method according to claim 3, wherein the one or more management services are associated with one or more control plane functions included in the register.

6. The method according to claim 1, wherein the one or more service attributes comprise an attribute indicating a related function at the control plane of the communication network.

7. The method according to claim 1, wherein the request is from a function of the control or management planes of the communication network.

8. The method according to claim 1, wherein the consumer is a radio intelligent controller for an open radio access network.

9. An apparatus, comprising:
at least one processor; and
at least one memory including computer program code, the at least one memory and computer program code being configured, with the at least one processor, to cause the apparatus to perform
creating, at a management plane of a communication network, a register of services and a register of producers of services in the communication network, wherein the management plane comprises one or more management functions for setting up and managing individual or groups of network functions at a control plane of the communication network, and wherein a request is from a function at one hierarchical layer of the management plane,
receiving information about one or more producers at another hierarchical layer of the management plane; and
based on at least one of the registers, providing to a consumer information about one or more producers providing services associated with one or more service attributes indicated by the consumer and information about one or more services associated with service attributes indicated by the consumer, wherein the service attributes comprise reporting capabilities, periodic and historical time scheduling, file reporting type, streaming reporting type, notification reporting type, reporting condition/trigger, type of data collected for service comprising a percentage of user equipment and average/distribution, geographical area, target scope of a single user equipment, pre-processing options including aggregation and filtering, analytics types, statistics or prediction, algorithm options between artificial intelligence and machine learning, time ahead, prediction-frequency, confidence degree, and vendor information.

10. An apparatus, comprising:
at least one processor; and
at least one memory including computer program code, the at least one memory and computer program code being configured, with the at least one processor, to cause the apparatus to perform
directing a request to a producer, at a management plane of a communication network, of a register of services and a register of producers of services in the communication network, wherein the request indicates service attributes, wherein the management plane comprises one or more management functions for setting up and managing individual or groups of network functions at a control plane of the communication network, wherein the request is from a function at one hierarchical layer of the management plane, and wherein the service attributes comprise reporting capabilities, periodic and historical time scheduling, file reporting type, streaming reporting type, notification reporting type, reporting condition/trigger, type of data collected for service comprising a percentage of user equipment and average/distribution, geographical area, target scope of a single user equipment, pre-processing options including aggregation and filtering, analytics types, statistics or prediction, algorithm options between artificial intelligence and machine learning, time ahead, prediction-frequency, confidence degree, and vendor information;
receiving information about one or more producers at another hierarchical layer of the management plane; and
receiving from the register producer information about one or more producers in the communication network of services associated with the one or more service attributes indicated by the consumer, and/or information about one or more services associated with the one or more service attributes indicated by the consumer.

11. An apparatus, comprising:
at least one processor; and
at least one memory including computer program code, the at least one memory and computer program code being configured, with the at least one processor, to cause the apparatus to perform
creating, at a control plane of a communication network, a register of services including one or more management services and a register of producers of services including one or more producers of management services at a management plane of the communication network, wherein the management plane comprises one or more management functions for setting up and managing individual or groups of network functions at a control plane of the communication network, and wherein a request is from a function at one hierarchical layer of the management plane,
receiving information about one or more producers at another hierarchical layer of the management plane; and
providing, to a consumer, information identifying one or more producers in the communication network of one or more services associated with service attributes indicated by the consumer, and information identifying one or more services associated with the service attributes indicated by the consumer, wherein the management plane comprises one or more management functions for setting up and managing individual or groups of network functions at a control plane of the communication network, and wherein the attributes comprise reporting capabilities, periodic and historical time scheduling, file reporting type, streaming reporting type, notification reporting type, reporting condition/trigger, type of data collected for service comprising a percentage of user equipment and average/distribution, geographical area, target scope of a single user equipment, pre-processing options including aggregation and filtering, analytics types, statistics or prediction, algorithm options between artificial intelligence and machine learning, time ahead, prediction-frequency, confidence degree, and vendor information.

12. An apparatus, comprising:

at least one processor; and at least one memory including computer program code, the at least one memory and computer program code being configured, with the at least one processor, to cause the apparatus to perform directing a request to a producer, at a control plane of a communication network, of a register of services including at least one management service and a register of producers of services including at least one producer of a management service at a management plane of the communication network, wherein the request indicates service attributes, wherein the management plane comprises one or more management functions for setting up and managing individual or groups of network functions at a control plane of the communication network, wherein the request is from a function at one hierarchical layer of the management plane, and wherein the service attributes comprise reporting capabilities, periodic and historical time scheduling, file reporting type, streaming reporting type, notification reporting type, reporting condition/trigger, type of data collected for service comprising a percentage of user equipment and average/distribution, geographical area, target scope of a single user equipment, pre-processing options including aggregation and filtering, analytics types, statistics or prediction, algorithm options between artificial intelligence and machine learning, time ahead, prediction-frequency, confidence degree, and vendor information;

receiving information about one or more producers at another hierarchical layer of the management plane; and receiving, from the register producer, information about one or more producers at a management plane of the communication network of management services associated with the indicated one or more service attributes, and/or information about one or more management services associated with the indicated one or more service attributes.

13. A computer program embodied on a non-transitory computer-readable medium, said computer program comprising instructions which, when the program is executed by a computer, cause the computer to carry out the method of claim 1.

14. A computer program embodied on a non-transitory computer-readable medium, said computer program comprising instructions which, when the program is executed by a computer, cause the computer to carry out the method of claim 2.

15. A computer program embodied on a non-transitory computer-readable medium, said computer program comprising instructions which, when the program is executed by a computer, cause the computer to carry out the method of claim 3.

16. A computer program embodied on a non-transitory computer-readable medium, said computer program comprising instructions which, when the program is executed by a computer, cause the computer to carry out the method of claim 4.

* * * * *